United States Patent Office 3,338,304
Patented Aug. 29, 1967

3,338,304
WATERFLOODING PROCESS USING MUCILAGE GUM THICKENERS
James L. Lummus, Tulsa Okla., assignor to Pan American Petroleum Corporation, Tulsa, Okla., a corporation of Delaware
Filed Aug. 30, 1965, Ser. No. 483,602
7 Claims. (Cl. 166—9)

ABSTRACT OF THE DISCLOSURE

The viscosity of water in a water drive is increased with a mucilage gum derived from flax meal. This substance has less tendency to be adsorbed on clay surfaces than some high molecular weight polymers that have been studied. The water-extracted flax gum could be deactivated with clay to remove the adsorbable fraction and the residual solution be used for the "pusher flood," to avoid decreasing permeability around the well bore and keep the solution in contact with the oil at essentially the same viscosity as the injected fluid.

---

Figure 1:
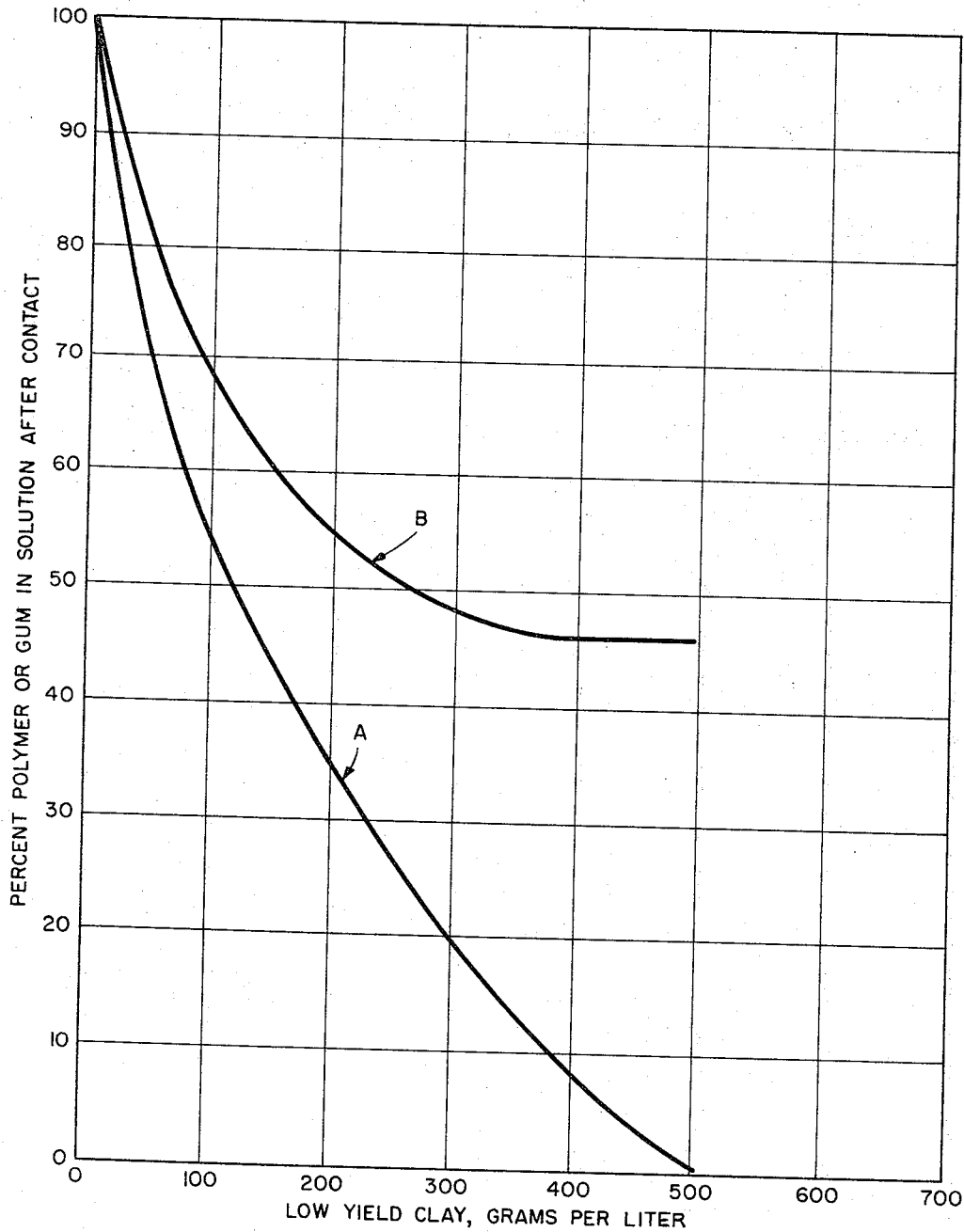

The present invention relates to secondary oil recovery by means of a novel waterflooding method. More particularly it is concerned with improvement of the sweep efficiency of the water bank which drives the oil to the producing wells.

Briefly, the process of my invention involves the use of relatively small amounts of a mucilage gum—derived from water extraction of certain seeds—in the water bank adjacent the oil, for the purpose of increasing the viscosity of said bank thereby improving the sweep efficiency of the waterflooding operation. Gum solutions of the type contemplated herein have exhibited good stability at temperatures of the order of 150° F.

It has been known for some time that the sweep efficiency of a liquid drive medium can be improved if the viscosity of such medium is increased, i.e., the mobility of the water reduced. This decreased mobility of the driving phase improves the areal sweep efficiency within each stratum invaded and also the vertical sweep efficiency in stratified reservoirs. In the waterflooding process, the relatively high mobility of the water compared to the mobility of the oil generally causes extensive bypassing or channeling of the water resulting in poor contact of the oil bank with water and low oil recovery. The tendency of water to channel or bypass the oil is due primarily to two factors. The reservoir permeability varies widely thereby permitting large volumes of water to flow through the reservoir at one point while allowing only small amounts to penetrate the reservoir at other locations. Secondly, the viscosity of oil varies considerably. In some instances the viscosity of certain crude oils may be only a few tenths of a centipoise while in other cases it may be 100 centipoises or higher. It has been determined that a waterflooding operation is much less efficient with viscous oil than with those of lower viscosity. Otherwise stated, the channeling and bypassing tendencies of a water drive are more or less directly related to the ratio of the reservoir oil viscosity to the viscosity of the aqueous flooding medium. It has been established that when the mobility ratio of the driven fluid (oil) to the driving fluid (water) is decreased, the oil recovery efficiency is increased. Thus a given volume of flood water will recover greater volumes of oil from a reservoir as the mobility ratio decreases. This observation has been reaffirmed by demonstrating that the oil displacement efficiency of flood water can be increased by either increasing the viscosity of water or decreasing the viscosity of the oil. Attempts to improve oil recoveries in waterflooding operations embodying each of these approaches have been made with varying degrees of success.

In recent years considerable effort has been directed to increasing the viscosity of water by addition thereto of certain water soluble materials, for example, polymers such as the partially hydrolyzed polyacrylamides. Details of such procedures are described in U.S. 3,039,529 and U.S. 2,827,964. I have found, however, that these procedures have a number of features which render them of questionable practical value. For example, substantial amounts of these and similar polymers are adsorbed on the reservoir rock causing a reduction in the polymer solution viscosity. Typical losses of polymer to the rock run about 60 micrograms per gram of rock contacted. Higher losses are not uncommon. A permanent reduction in rock permeability results from the flow of polymer solutions therethrough—such reduction amounting to about 35 percent of the original permeability.

Accordingly, it is an object of my invention to provide an aqueous flooding medium or system having a substantially increased sweep efficiency by decreasing the mobility ratio of water to oil by the addition thereto of a gum derived from flax meal or an equivalent source. It is another object of my invention to provide an aqueous flooding medium of increased viscosity wherein the material producing such viscosity is not readily adsorbed on the reservoir rock through which such medium passes. It is still another object of my invention to provide a means for treating water solutions of gums of the type contemplated herein so that the constituent therein responsible for increasing viscosity is not readily adsorbed on the rock as the solution flows through the reservoir.

In carrying out the purpose of my invention I mix into a given volume of flood water a concentrated extract of the gum in an amount sufficient to produce a final solution containing from about .3 to about 3 weight percent. The resulting solution is then introduced into the formation to be flooded via an injection well which may, for example, be the center well of a typical 5-spot pattern. In one embodiment of my invention, the volume of such solution injected should be adequate to form a distinct slug or liquid bank between the oil to be driven and the water supplying the driving force to propel the oil through the reservoir. The quantity of gum solution required to form such a slug usually ranges from about 10 to about 30 percent of the pore volume of the reservoir. This solution is then forced through the reservoir by means of the driving fluid. Alternatively, I may add the gum to the entire volume of flood water employed.

The gum—which may be derived from flax meal, or psyllium or quince seeds—is generally obtained by subjecting the source to countercurrent extraction with hot (150° F.) water. Cold water can be used but ordinarily is not as effective in recovering the gum.

One surprising feature of the gum materials contemplated by my invention resides in the fact that their aqueous solutions can be rendered relatively insensitive to adsorption by reservoir rock. Thus, I have observed that in the fresh gum solutions there are components that tend to adsorb rather readily on the reservoir rock; however, the concentration of gum in solution thereafter remains substantially constant. This phenomenon is clearly illustrated in FIGURE 1 which is based on an investigation wherein a water solution of flax gum was contacted with varying amounts of finely ground low-yield silica-containing clay. This gum solution was prepared by extracting flax meal with cold water, the meal being present in a concentration of about 5 pounds per barrel of water. A 0.5 percent aqueous solution of a partially hydrolyzed polyacrylamide was also subjected to clay treatment in similar fashion. The curves in FIGURE 1 show the apparent concentration of polymer (30% hydrolyzed polyacrylamide) and gum in solution plotted against the amount of low-yield clay used in the treatment. Curve A, which is a plot of the polymer solution, appears to follow a Freundlich isotherm form. Whereas Curve B (flax gum) follows a similar path down to where about half the gum has been adsorbed after which gum concentration remains constant with contact of increasing amounts of low-yield clay.

It should also be pointed out that the initial viscosity of the polymers and flax gum solutions were 3.09 and 3.22 centipoises, respectively, but after clay treatment—with a total of 500 grams of clay per liter—the final viscosity of the polymer solution was .9 cp. whereas the final viscosity of the flax gum system was 1.81 cps. This demonstrates the superiority of these gum solutions over polymers of the type now used for increasing water viscosity to retain a desirable and effective mobility ratio when used to drive oil through a reservoir.

Thus, it is seen that by deactivating the adsorbable fraction in such gum solutions with clay, an aqueous system is provided that does not decrease the permeability around the well bore as does any adsorbed material and, as a result, the solution in contact with the oil has essentially the same viscosity as the injected fluid. For a given gum concentration, however, the viscosity of such solutions decreases with increasing temperature.

A comparison was made of the behavior of gum and polymer solutions of the aforesaid type in cores from formations typical of those in which flooding operations are effected. This study demonstrated the superiority of the gum solutions over polymer solutions in several respects. In carrying out the polymer solution tests the solution in all cases contained 0.1 weight percent of 40 percent hydrolyzed polyacrylamide in 0.25 N in sodium chloride, the latter being 90 percent sodium chloride and 10 percent calcium chloride. The tests were conducted in Torpedo sandstone cores and unconsolidated sand packs 1⅞″ in diameter and 1 ft. long. Flow tests were conducted at constant flow rates (about 3 ft. per day linear advance) using a Ruska piston pump and pressure drops were monitored using a Statham pressure transducer and auxiliary sensing and recording equipment. The procedure employed consisted of first saturating the cores with brine, then flowing brine to establish the initial core permeability. A polymer solution was next flowed until the pressure drop across the core stabilized. This served to determine the mobility of the polymer solution. Brine flow was then resumed to establish the final core permeability to brine. Flow was continued until the pressure drop stabilized and no polymer remained in the core effluent. The initial permeability of the sandstone core to brine was found to be 425 millidarcies. After treatment with the polymer solution permeability to brine was found to have decreased to 66 percent of the original value. In similar tests with flax gum solutions prepared by extracting flax meal in a concentration of 5 pounds per barrel of water and thereafter treating with low-yield clay, it was found that the Torpedo sandstone core retained 92 percent of its original permeability after treatment with the gum solution.

Tests were also made, by analysis of the core effluent, to determine the extent of polymer loss when an aqueous solution thereof was passed through a sandstone core. Viscometry was employed since it allowed simple and accurate determination of polymer concentration. The solution used contained 0.1 weight percent polymer (40 percent hydrolyzed polyacrylamide) having a viscosity of about 1.5 cps. higher than that in the 0.25 N in sodium chloride. The relationship between viscosity and concentration was established experimentally by measurements on solutions of varying known concentrations.

Tests were also carried out with two flax gum solutions derived from extracting flax meal with water in a concentration of 5 pounds of meal per barrel of water and 20 pounds per barrel of water. The resulting extract from each solution was used as the test material. Prior to contacting these solutions with cores, however, they were treated with a low-yield clay to remove clay reactive portions of the solution. The sample solutions also contained 0.4 pound per barrel of paraformaldehyde as a preservative. Sufficient salt (90 percent sodium chloride and 10 percent calcium chloride) was added to make the solutions 0.25 N in sodium chloride.

Both of these flax meal solutions were subjected to flow tests in a 1⅞″ diameter by 6″ long Torpedo sandstone core having a permeability of 850 millidarcies. The core was saturated with brine and the brine flowed until the pressure drop across the core—as measured with a water manometer—stabilized. Brine was then injected until the pressure drop again stabilized. Finally, the extract derived from the 20 pounds of flax-meal-per-barrel solution was injected until the pressure drop stabilized. All flow rates were 16 cc. per hour, which corresponds to a superficial velocity of 3 ft./day. In the case of the extract derived from the solution containing 5 pounds of flax meal per barrel of water, the ratio of flax-meal-extract pressure drop to brine pressure drop was observed to be 1.7 as compared to a predicted value of 1.6 based on Darcy's law. For the extract obtained from the mixture of 20 pounds of flax meal per barrel of water, the corresponding ratios were 4.0 and 4.2, thus demonstrating that in the core system investigated, the viscosity of the flax gum solution remained substantially unaffected.

Figure 2:
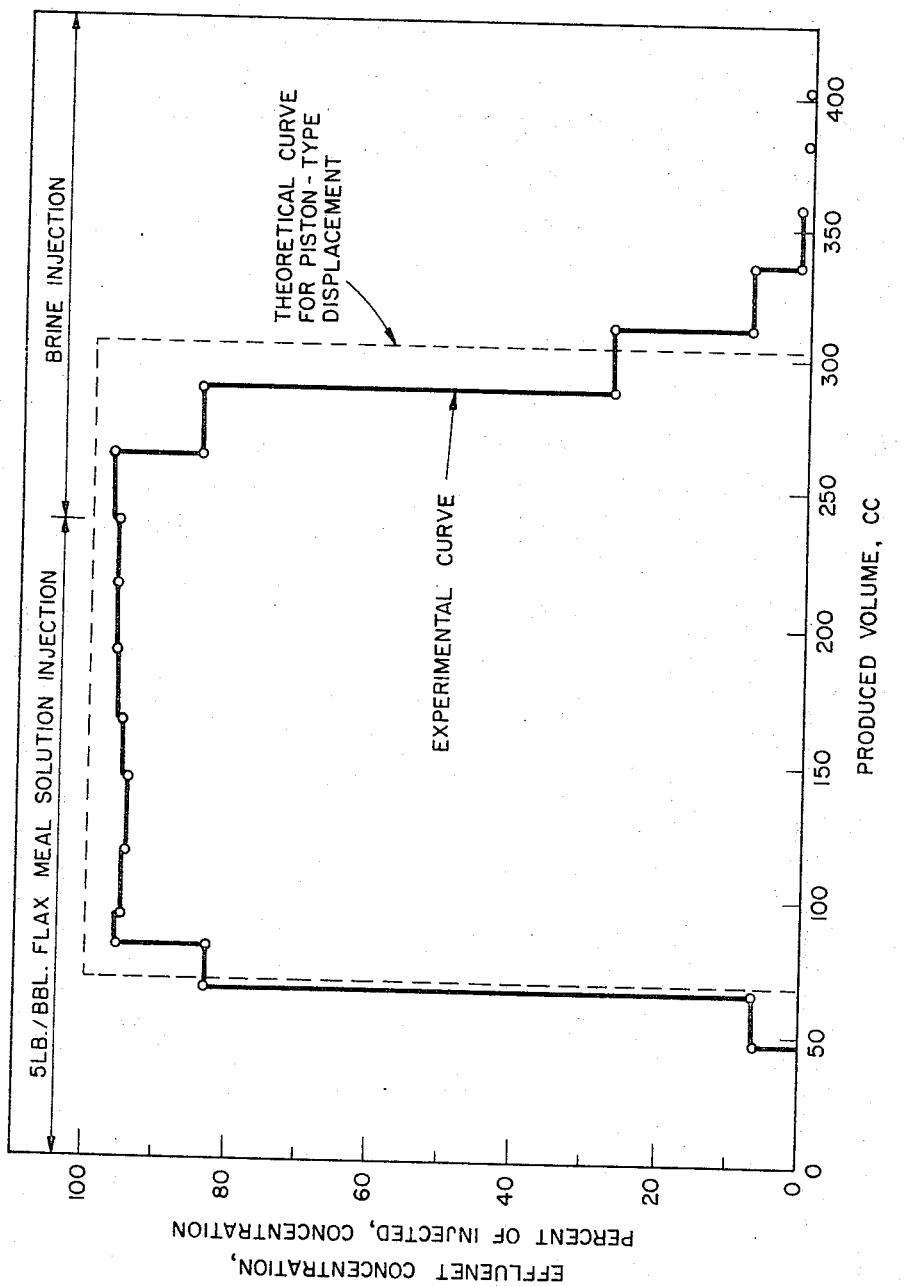

During injection of the extract derived from the 5 pounds per barrel of flax meal solution and subsequent brine injection, samples of the core effluent were taken and their viscosity determined. These viscosities were related to concentrations by an experimentally determined viscosity-concentration relationship. FIGURE 2 shows the effluent concentration-fluid production profile. The flax gum solution had an effluent concentration of about 94 percent of the injected concentration after 1.4 pore volumes were injected into the brine-filled core. After 3.5 pore volumes injection, the effluent concentration had increased to 96 percent of the injected concentration.

In carrying out the process of my invention practices generally followed in conventional waterflooding operations may be employed after a bank of suitable size containing an aqueous slug of increased viscosity has been established at the leading edge of the waterflood. It will be apparent to those familiar with this field that by supplying a gum of the type contemplated herein for use in increasing the viscosity of aqueous drive media, an important advance in secondary recovery operations is provided by the present invention. This is primarily due to the fact that I have not only found a class of materials capable of increasing the viscosity of the leading edge of a waterflood system, but that such materials are relatively resistant to adsorption by the reservoir rock making possible the use of a fluid drive system, the leading edge of which has a substantially constant viscosity.

I claim:

1. In a method for recovering petroleum from a reservoir thereof by means of a waterflooding operation, the step which comprises improving the sweep efficiency of tthe water by adding thereto a water soluble gum derived from the group of plant seeds consisting of flax, psyllium, and quince seeds.

2. The method of claim 1 in which the water soluble gum is derived from flax seed.

3. In a method for recovering oil from a reservoir thereof by means of a waterflooding operation, the steps which comprise injecting into said reservoir and adjacent said oil an aqueous solution of a gum derived from the group of plant seeds consisting of flax, psyllium, and quince seeds, said aqueous solution having a viscosity greater than 1 cp., in an amount corresponding to from about 5 to about 15 percent by volume of the pore volume of said reservoir, and thereafter injecting water into said reservoir to drive said solution and said oil through said reservoir.

4. The method of claim 3 wherein the amount of water soluble gum employed in said aqueous solution ranges from about .2 to about 3 weight percent.

5. The method of claim 4 in which the water soluble gum is derived from flax seed.

6. In a method for recovering oil from a reservoir thereof by means of a waterflooding operation, the step which comprises injecting into said reservoir and adjacent said oil an aqueous solution of a gum derived from the group of plant seeds consisting of flax, psyllium, and quince seeds, said aqueous solution having a viscosity greater than 1 cp., in an amount corresponding to from about 5 to about 15 percent by volume of the pore volume of said reservoir, thereafter injecting water into said reservoir to drive said solution and said oil through said reservoir, and recovering oil from the latter.

7. In a method for the recovery of oil from a reservoir thereof, penetrated by a producing well and an injection well, by means of a water-flooding operation; the steps which comprise contacting an aqueous extract of plant seeds selected from the group of flax, psyllium, and quince seeds with a low-yield clay whereby the fraction present in said extract that is readily adsorbable on said reservoir rock is removed therefrom, introducing the resultant solution into said injection well and then into said reservoir in an amount corresponding to from about 5 to about 15 percent by volume of the pore volume of said reservoir, and thereafter injecting water into said reservoir to drive said oil through said reservoir.

References Cited

UNITED STATES PATENTS

| 2,731,414 | 1/1956 | Binder et al. | 166—10 X |
| 2,827,964 | 3/1958 | Sandiford et al. | 166—9 |
| 3,039,529 | 6/1962 | McKennon | 166—9 |
| 3,087,539 | 4/1963 | Maurer | 166—9 |

OTHER REFERENCES

Hunt et al., "The Structure of Linseed Mucilage," Chemical Abstracts, vol. 57 (1962), page 11439h.

CHARLES E. O'CONNELL, *Primary Examiner.*

STEPHEN J. NOVOSAD, *Examiner.*

UNITED STATES PATENT OFFICE
CERTIFICATE OF CORRECTION

Patent No. 3,338,304　　　　　Dated　August 29, 1967

Inventor(s)　James L. Lummus

It is certified that error appears in the above-identified patent and that said Letters Patent are hereby corrected as shown below:

Column 1, line 18, "pusher flood" should read -- aqueous flood --.

Signed and sealed this 14th day of November 1972.

(SEAL)
Attest:

EDWARD M. FLETCHER, JR.　　　　　ROBERT GOTTSCHALK
Attesting Officer　　　　　　　　Commissioner of Patents